United States Patent
Sherman

(10) Patent No.: US 8,416,215 B2
(45) Date of Patent: Apr. 9, 2013

(54) IMPLEMENTATION OF MULTI-TOUCH GESTURES USING A RESISTIVE TOUCH DISPLAY

(75) Inventor: Itay Sherman, Hod Hasharon (IL)

(73) Assignee: Itay Sherman, Hod Hasharon (IL)

( * ) Notice: Subject to any disclaimer, the term of this patent is extended or adjusted under 35 U.S.C. 154(b) by 252 days.

(21) Appl. No.: 13/020,026

(22) Filed: Feb. 3, 2011

(65) Prior Publication Data

US 2011/0193819 A1  Aug. 11, 2011

Related U.S. Application Data

(60) Provisional application No. 61/302,134, filed on Feb. 7, 2010, provisional application No. 61/304,470, filed on Feb. 14, 2010.

(51) Int. Cl.
*G06F 3/045* (2006.01)
(52) U.S. Cl. ..................... 345/174; 178/18.05
(58) Field of Classification Search .................. 345/173, 345/174; 178/18.01, 18.03, 18.05, 18.06, 178/18.07; 200/511, 512; 338/114, 115; 430/312, 313; 438/384
See application file for complete search history.

(56) References Cited

U.S. PATENT DOCUMENTS

| | | | |
|---|---|---|---|
| 5,943,043 A | 8/1999 | Furuhata et al. | |
| 6,958,749 B1 | 10/2005 | Matsushita et al. | |
| 6,992,660 B2 | 1/2006 | Kawano et al. | |
| 7,254,775 B2 | 8/2007 | Geaghan et al. | |
| 7,439,963 B2 * | 10/2008 | Geaghan et al. | 345/173 |
| 7,633,300 B2 | 12/2009 | Keroe et al. | |
| 2005/0046621 A1 | 3/2005 | Kaikuranta | |
| 2009/0322699 A1 | 12/2009 | Hansson | |
| 2009/0322701 A1 | 12/2009 | D'Souza et al. | |

* cited by examiner

*Primary Examiner* — Abbas Abdulselam

(57) ABSTRACT

A system based on a standard resistive touch screen that is capable of detecting double point or finger taps or gestures, and districting them from single point or finger taps or gestures. The system uses either a standard analog touch controller capable of four measurement types or a modified analog touch controller capable of six or more measurement types, and the fixed known resistance ratio of the touch film layers, to calculate an approximation of the location of up to two separate touch points on the screen. A collection of the location samples is used to detect different single and double finger gestures.

10 Claims, 7 Drawing Sheets

Touch screen system diagram

Standard resistive touch screen construction
(taken from TSC2007 datasheet by Texas Instruments)

Standard resistive touch screen system connection
(taken from TSC2007 datasheet by Texas Instruments)

Standard resistive analog touch controller implementation
(taken from TSC2007 datasheet by Texas Instruments)

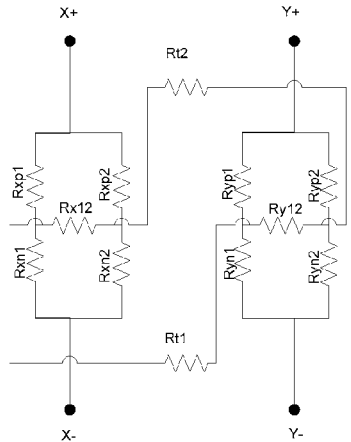

*X1, Y1* – normalized coordinates of first touch point
*X2, Y2* – normalize coordinates of second touch point
*Rxplate* = Resistance of the sheet between *X+*, *X-* electrodes
*Ryplate* = Resistance of the sheet between *Y+*, *Y-* electrodes

*Rxp1* = Resistance of X plate from *X+* to touch point 1 = *Rxplate*X1*
*Rxp2* = Resistance of X plate from *X+* to touch point 2 = *Rxplate*X2*
*Rxn1* = Resistance of X plate from *X-* to touch point 1 = *Rxplate*(1 - X1)*
*Rxn2* = Resistance of X plate from *X-* to touch point 2 = *Rxplate*(1 - X2)*
*Rx12* = Resistance of X plate from touchpoint1 to touch point 2 =
= *Rxplate*[(X1 - X2)^2 + (Y1 - Y2)^2)]^0.5*

*Ryp1* = Resistance of Y plate from *Y+* to touch point 1 = *Ryplate*Y1*
*Ryp2* = Resistance of Y plate from *Y+* to touch point 2 = *Ryplate*Y2*
*Ryn1* = Resistance of Y plate from *Y-* to touch point 1 = *Ryplate*(1 - Y1)*
*Ryn2* = Resistance of Y plate from *Y-* to touch point 2 = *Ryplate*(1 - Y2)*
*Ry12* = Resistance of Y plate from touchpoint1 to touch point 2 =
= *Ryplate*[(X1 - X2)^2 + (Y1 - Y2)^2)]^0.5*

*Rt1* = Resistance of touch point between X and Y plate for touch point 1
*Rt2* = Resistance of touch point between X and Y plate for touch point 1

Approximate model of two point touch on resistive touch screen

FIG. 4

Touch screen system diagram

Implementation of analog touch controller

Simplified flow chart for the measurement process

IMPLEMENTATION OF MULTI-TOUCH GESTURES USING A RESISTIVE TOUCH DISPLAY

CROSS REFERENCES TO RELATED APPLICATIONS

This application claims priority benefit of U.S. Provisional Application No. 61/302,134, entitled IMPLEMENTATION OF MULTI TOUCH GESTURES ON STANDARD RESISTIVE TOUCH SCREEN, filed on Feb. 7, 2010 by inventor Itay Sherman, and of U.S. Provisional Application No. 61/304,470, entitled IMPLEMENTATION OF MULTI-TOUCH GESTURES USING MODIFIED ANALOG RESISTIVE TOUCH CONTROLLER, filed on Feb. 14, 2010 by inventor Itay Sherman.

FIELD OF THE INVENTION

The field of the present invention is touch screen technology.

BACKGROUND OF THE INVENTION

Many mobile handsets and other consumer electronic devices are currently operated using touch technology. The number of these devices is rapidly increasing.

The most common touch technologies are resistive touch and capacitive touch. The resistive touch screens are the most common and have lower price.

A prior art resistive touch screen is described in FIG. 1. The touch screen is composed of two layers of thin conductive film (ITO) that are overlaid on top of each other. The film is conductive but has resistance. The two layers are separated by non conductive material such as air. When pressed the top layer makes contact with the lower layer and allows conductivity between the two layers.

Each of the film sheets has two electrodes/conductive bars on its sides. One film has two electrodes on its X axis, denoted X+ and X− while the other film has electrodes on its Y axis, denoted Y+ and Y−. The two film layers may be mounted on a glass surface above a display or directly over a display or may be mounted over any other surface.

The touch screen is connected to an analog touch controller that connects to a touch digital analysis controller that may operate as a standalone device or may be embedded on a CPU firmware. A sample implementation of such a system based on a commercial analog touch controller, namely, Texas Instruments TSC2007, is presented in FIG. 2.

The analog touch controller can apply voltage gap between two of the electrodes and measure the voltage on a third electrode. The standard practice is to apply voltage to X+ and X− and measure voltage on Y+, and then apply voltage to Y+ and Y− and measure voltage on X+. It can be easily shown that when a single point of contact is made between the two layers and assuming the layers are uniform, the measured voltage on Y+ divided by the voltage gap on X+ and X− would be the relative offset on the X axis of the contact point. The same applies to the second measurement that represents the offset on the Y axis.

Standard analog touch controllers also offer the option to apply voltage between the Y+ and X− electrodes and measure the voltage on either the X+ or Y− electrodes. These two measurements are referred to as Z1 and Z2. FIG. 3 illustrates a prior art implementation of such a controller.

It can be shown that the resistance of the touch point can be derived from the measurements in at least three separate ways.

$$R\text{touch1} = R\text{xplate} * X * (Z2/Z1 - 1), \quad (1)$$

$$R\text{touch2} = R\text{xplate} * X * (1/Z1 - 1) - R\text{yplate} * (1 - Y), \quad (2)$$

where X and Y are the normalized X and Y offsets as derived from the first two measurements, Z1 and Z2 are normalized Z1 and Z2 measurements and Rxplate and Ryplate are the fixed resistance of the X and Y layers of film, which can be measured on production line or be found as part of calibration process.

It should be noted that three other cross measurements that involve supply of voltage potential between one electrode located on one of the resistive layers to another located on the other layer (Y−, X−) (Y+, X+) (Y−, X+) can be used to derive Z1 and Z2 measurements that can be used to derive Rtouch, as defined above.

A standard resistive analog touch controller usually also includes a touch detection circuitry that is used to indicate to the system touch analysis controller that a touch event had occurred. The analysis controller would then instruct the analog controller to perform a set of measurements to obtain the X and Y location of the touch point and optionally also the relative touch pressure as indicated by the touch resistance. The procedure is illustrated in FIG. 3.

The standard resistive touch screen is used to detect single finger or stylus pressed or movements (gestures) on the display surface. The technology was not designed to process more than a single point of connection on the display.

Newer technologies such as the capacitive touch screens and some more advanced variations on the resistive displays allow for detection of multiple simultaneous touch events on the display surface. Many of these solutions are composed of surfaces that are segmented to multiple separate regions. The controllers used to process the touch information are then connected via separate leads to each of these separate regions of the surface and apply multiple separate measurements to the resistance or capacitance of the plurality of regions. These solutions are more complex and higher cost in comparison to the standard resistive touch screen.

The most common usage for the multi touch technology is for detection of complex gestures that involve more than one finger touching the display. Many of these gestures are based on two finger operation. Some examples include double finger swiping of the fingers across the display (horizontally or vertically), double finger tap on the display, and pinch movement of two fingers.

In order to allow for lower cost design it would be beneficial to be able to support the detection of these most common double finger gestures and distinguishing them from single finger gestures using simpler lower cost technology. The present invention satisfies this need.

SUMMARY OF THE INVENTION

Aspects of the present invention include a system that includes a standard resistive touch screen, a modified resistive analog touch controller connected to a modified touch analysis controller that is capable of detection of two finger gestures and distinguishing them from single finger or stylus presses or gestures.

Further aspects of the present invention include a modified analog touch controller that is capable of performing from six and up to twelve different measurements were voltage gap is applied between a combination of two touch screen terminals and measured on one of the other two.

Further aspects of the invention include a modified touch analysis controller that analyzes the results obtained from either a standard analog touch controller or the described modified analog touch controller and based on these multiple measurements is capable of determining if the screen is touched in single or multiple points, and to be able to determine the location of the touch points on the display given that they include one or two discrete areas.

Multiple embodiments are disclosed, using from four to twelve different measurements from the analog touch controller, for performing the above described analysis. Alternative embodiments using different approaches for the analysis are also disclosed.

BRIEF DESCRIPTION OF THE DRAWINGS

The present invention will be more fully understood and appreciated from the following detailed description, taken in conjunction with the drawings in which:

FIG. 4 is an illustration for mathematical equations that approximate the measurements of the touch screen for two touch points, in accordance with an embodiment of the present invention;

DETAILED DESCRIPTION

Figure 1:
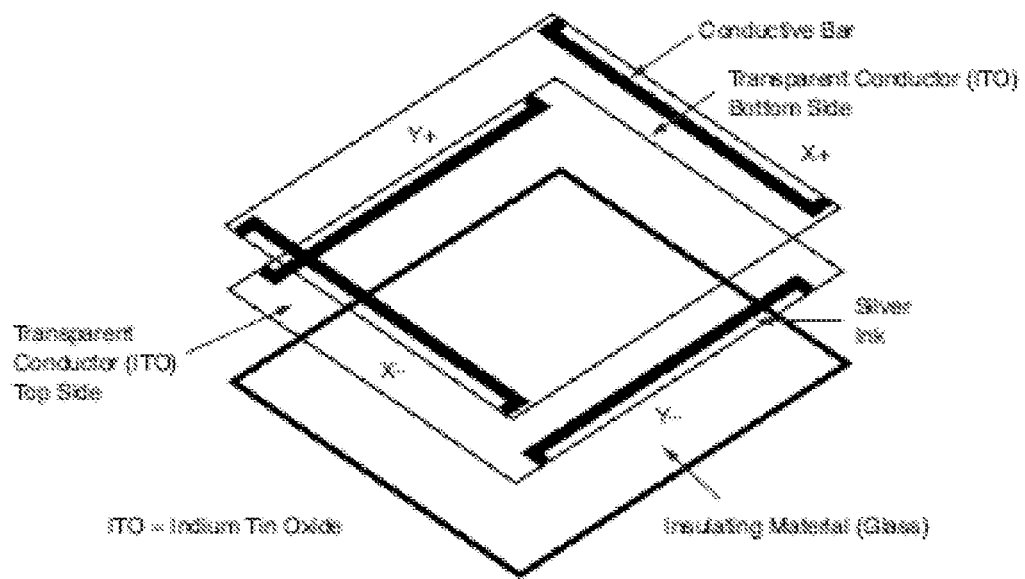
FIG. 1 is a prior art diagram of a resistive touch screen.
Figure 2:
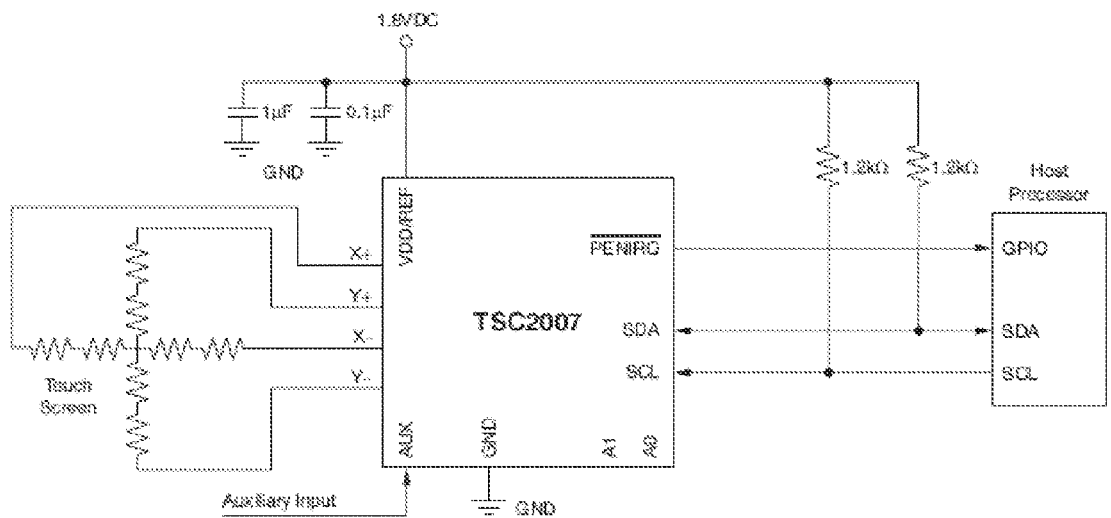
FIG. 2 is a prior art diagram of touch screen and controllers system connection.
Figure 3:
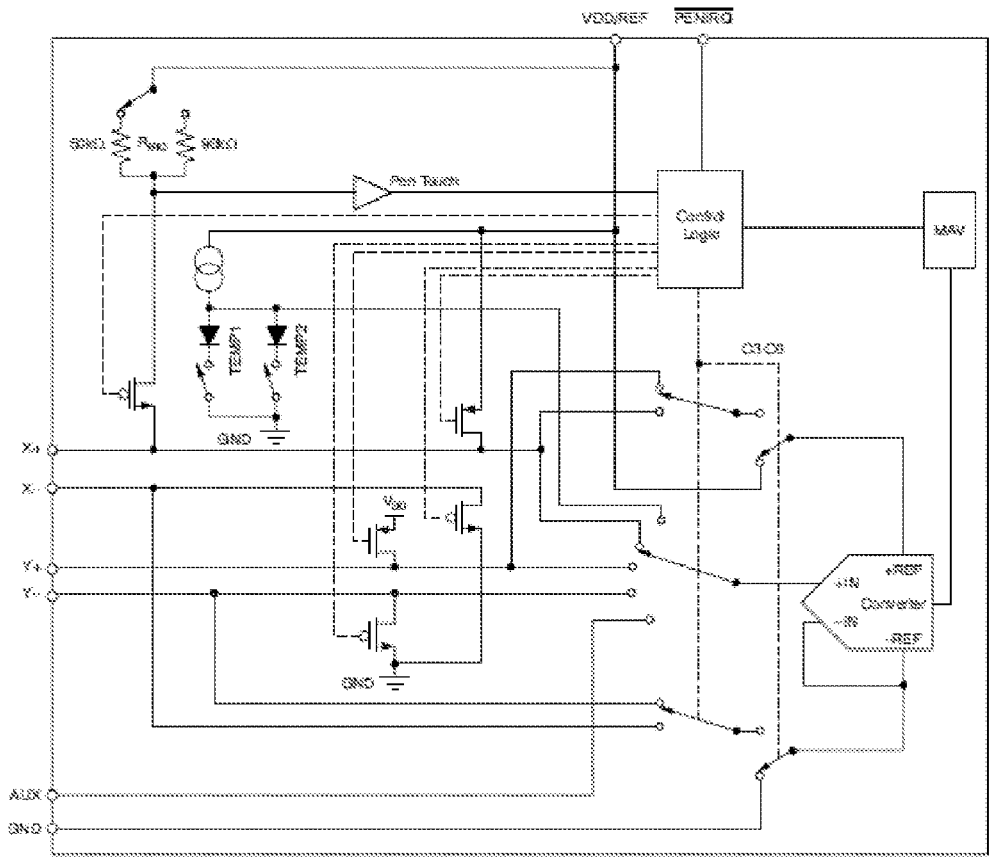
FIG. 3 is a prior art diagram of a resistive analog touch controller.
Figure 5:
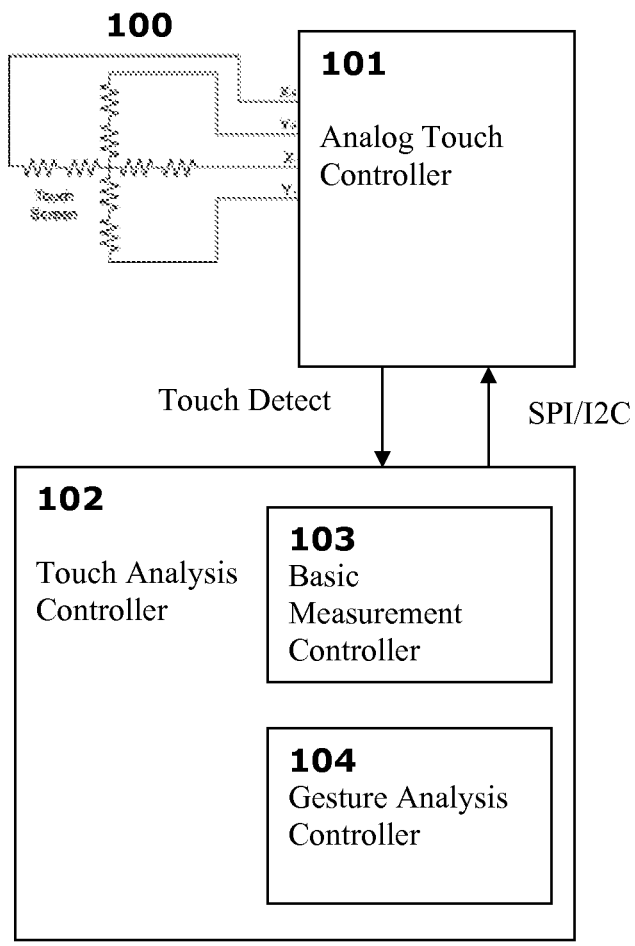
FIG. 5 is a diagram of a touch screen system in accordance with an embodiment of the present invention.

Embodiments of the present invention, as shown in FIG. 5, relate to a system that includes a resistive touch screen 100, and a modified analog touch controller 101 connected to a modified touch analysis controller 102 that is capable of detecting two finger gestures and distinguishing them from single finger or stylus presses or gestures. The touch analysis controller includes a basic measurement and analysis unit 103 that determines the location of the touch points and optionally a gesture analysis unit 104 that uses consecutive touch point measurements to detect single and double finger gestures.

The standard analog touch controller used by most resistive touch screens is performing the four measurements described hereinabove. In accordance with an embodiment of the present invention, the modified analog touch controller uses the four leads (X+, X−, Y+, Y−) to perform additional measurements. The measurements involve setting a voltage gap across two of the electrodes and measuring the voltage on one of the remaining leads. There are altogether twelve different combinations for this type of measurement.

Figure 6:
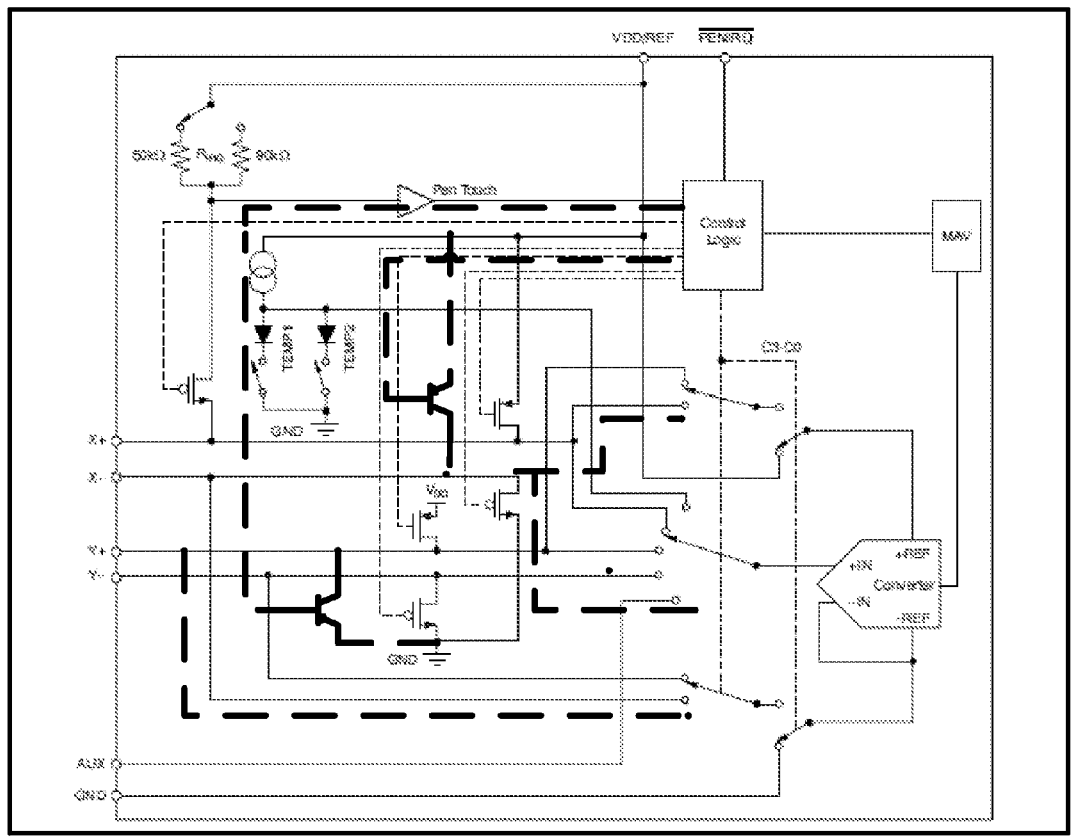
FIG. 6 is a diagram of an analog touch controller, in accordance with an embodiment of the present invention.

The described analog touch controller is capable of measuring at least six of these measurements. FIG. 6 is a diagram of an embodiment of the present invention for an analog controller that is capable of performing the required measurements. The bolded lines in FIG. 6 represent additions to a standard implementation. Such additions include the ability to select any of the four leads for measurements, the ability to connect the A/D convertor positive and negative reference voltages to three of the leads (in distinction to conventionally two leads), and the ability to connect Vcc and GND to three of the leads (in distinction to conventionally two leads). These additions allow for supporting of all twelve possible measurements. A partial implementation supporting only a subset of these measurements may also be performed.

In one embodiment of this invention a database for at least six of the different measurements is built for combinations of different pairs of touch points on the screen and different touch point resistances. The database may be built from actual measurements of the display, or from a mathematical model of the screen behavior as presented in FIG. 4. The database is stored or computed on the touch analysis controller. In order to achieve good resolution, the size of the database may become very large. For example, a resolution of 256 locations on the X & Y axis and ten different resistance levels requires a database of $256^4 * 10^2$ points.

Once the touch screen is touched, at least six different measurements are performed and the results obtained are compared to the stored results or model. A selection based on LMSE (Least Mean Square Error) may be used to match the received results to one of the stored results. The point pair for which the MSE was lowest is considered to represent the touch points currently on the screen.

Another variation of the above method is to assume the touch pressure of both fingers is relatively similar and constant. The database is built based on this assumption. The obtained results are relatively accurate when the touch pressure of the two fingers is similar. Simulations show that for reasonable finger size and touch pressures, the dependency of the results on the exact pressure is relatively weak and thus results obtained using this approximation are relatively accurate.

In another embodiment of present invention six different measurements are performed, as follows:

TABLE I

| Voltage measurements | | |
|---|---|---|
| Measurement notation | Voltage gap across | Point of measurement |
| Y | X+, X− | Y+ |
| Y' | X+, X− | Y− |
| X | Y+, Y− | X+ |
| X' | Y+, Y− | X− |
| Z1 | Y+, X− | X+ |
| Z2 | Y+, X− | Y− |

The analysis assumes that the two touch points are pressed with similar pressure, yielding similar touch resistance for both points.

For cases where two points on the touch screen are touched, the average value of X and X' approximates the value of the average of the X shift of the two touch points, i.e., $$CX = (X + X')/2 \approx (X1 + X2)/2, \quad (3)$$

and similarly $$CY = (Y + Y')/2 \approx (Y1 + Y2)/2. \quad (4)$$

For a single touch point on the screen the results obtained from X and X, and Y and Y' should be identical. In addition different calculations of Rtouch based on X, Y, Z1, Z2 or X', Y' generally provide the same result.

However for separate touch points the results obtained on these measurements differ.

From analysis of the approximated model shown in FIG. 4, it follows that the values of $$DX = X - X', \quad (5)$$

and $$DY=Y-Y', \quad (6)$$

for touch point pairs that share the same central point and are located on the same line, increase when the points are further separated. For points with exact same central point and distance, the values increase and reach maximal negative value when the points are on a line with angles of approximately 45 degrees, and maximal positive value when they are at approximately 135 degrees. The value reaches 0 for angles of 0 and 90 degrees. Moreover similar values are obtained for different central points, when the distance and angle are similar. In addition the ratio between DX/DY changes monotonically with the angles, in the range of 0 to 90 degrees. The exact value depends upon on the distance between the fingers, but is almost identical for different central points. The distance between the fingers is marked as R, and the angle of the line connecting them is marked as Alpha. It is therefore possible to generate a function that matches, with reasonable accuracy, alpha and R to DX and DX/DY; i.e.

$$F(R,\text{Alpha})=(DX,DX/DY). \quad (7)$$

This function may be derived from mathematical analysis, or by simulation of the touch display model, or from empirical measurements of the touch screen. It should be noted that this function also relies on the Ry value. If the cases where DX=0 are excluded, then there is a single match between R and Alpha, and DX, DX/DY pairs. The inverse function $$G(DX,DX/DY,Ry)=(R,\text{Alpha}) \quad (8)$$

may thus be derived.

In another embodiment of the present invention, the gap between the touch points is derived by mathematically solving the equations of a simplified version of the model presented in FIG. 4. Specifically, assume that Rt1=Rt2=0 and Rx12=Ry12=infinite. Under these assumptions the equations are solvable, and the gap in the x direction, dX, and the gap in the y direction, dY, may be directly derived from DX, DY, CX, CY and Ry. Results obtained using this method are approximate, but are sufficient to provide dual point information that can subsequently be used for gesture analysis. In this case, the only calibration value that needs to be derived for a touch screen in this case is Ry.

In addition to the X, X', Y, Y' measurements, the Z1 and Z2 measurements are used to derive Rtouch, by at least two different methods as presented EQS. (1) and (2). As shown in U.S. Provisional Application No. 61/302,134, the contents of which are hereby incorporated by reference, the difference between the two measurements, denoted by D, is indicative of the distance between the two fingers for cases where the two points are separated horizontally or vertically, and the sign of D is indicative of whether the separation is on the horizontal (0 degrees) or vertical axis (90 degrees). The value of D for different finger separations depends on the location of the fingers on the touch screen. For cases where the fingers are separated horizontally, a function that matches D to the location of a central point and finger distance can be defined, $$Hx(CX,CY,D)=R, \quad (9)$$

and similarly for the vertical case, $$Hy(CX,CY,D)=R. \quad (10)$$

As such, the distance between points, even for angles close to 0 or 90 degrees, where DX and DY are close to 0, may be evaluated. The functions Hx and Hy may be derived from mathematical analysis of the touch display model, or from empirical measurements of the touch screen.

A slightly different approach would be to use two of the Rtouch calculations (Rtouch1 and Rtouch2) and find the Ry'=Ryplate/Rxplate value that would make these two measurements identical; namely, $$Ry'=X*(1-Z2)/(Z1*(1-Y)). \quad (11)$$

The real value of Ry for a given display can be derived by simply calculating it from the above equations when a single point is touching the screen.

The difference between these two values, DR=Ry'-Ry, may be used as an indication of vertical or horizontal separation of the fingers. Simulation and measurements show that the value of DR has little dependency on the center point CX and CY, and is primarily dependent on the gap between the fingers and its direction, as well as the value of Ry. It is therefore possible to define respective functions $$dX=Hx(DR,Ry), \quad (12)$$

and $$dY=Hy(DR,Ry), \quad (13)$$

to find the gaps between the fingers. The functions Hx and Hy may be derived from simulation. As such, Ry is the only calibration value that needs to be derived for a touch screen.

Since the calculation of DR is based on measurements of X, Y, Z1 and Z2, its predicted error depends on errors of each of them. The dependency differs according to the location of the touch point on the screen.

By examining partial derivatives of the DR function, it may be seen that the function yields relatively high error values even for small measurement errors in cases where the touch points' central X location is close to 0, or when their Y location is close to 1. Best results are obtained when X is close to 1 and Y close to 0.

As described above other cross measurements may be used to derive Z values. These measurements have different error dependencies. By examining partial derivations, it follows that best results are obtained for the following measurements pairs, as follows:

for X+, Y− best results are obtained for X close to 0 and Y close to 1;

for Y+, X+ best results are obtained for X close to 0 and Y close to 0; and for Y−, X− best results are obtained for X close to 1 and Y close to 1.

In another embodiment of the present invention, the measurement process performs the X, X', Y, Y' measurements and, based on the approximated touch central point (CX, CY), performs the relevant cross measurements as follows:

for CX>0.5 and CY>0.5 use measurements when voltage gap is applied to X−, Y−;

for CX<0.5 and CY>0.5 use measurements when voltage gap is applied to X+, Y−;

for CX>0.5 and CY<0.5 use measurements when voltage gap is applied to Y+, X−; and for CX<0.5 and CY<0.5 use measurements when voltage gap is applied to Y+, X+.

These measurements are then used to calculate Ry' as described hereinabove and, based thereon, derive DX and DY using the Hx and Hy functions from EQS. (12) and (13).

An alternative embodiment uses a standard analog touch controller in combination with an analysis controller that only performs the D or Ry' calculations, as described hereinabove.

The standard analog controller performs the X, Y, Z1 and Z2 measurements. Since the X' and Y' measurements are not available they may not be used for calculations, and DX and DY are not available. Nevertheless D or Ry' may be calculated based on the four available measurements (assuming that the X and Y measurements represent the value of the central point of touch CX, CY). In this case the analysis controller detects two fingers and their approximated gap only if they are aligned close to 0 or 90 degrees; for other angles the function may suffer from sensitivity and may provide erroneous results. As explained hereinabove regarding the standard Z measurements, the Ry and D functions yield relatively high error values even for small measurement errors in cases where the touch points' central X location is close to 0, or when their Y location is close to 1.

With all of the above limitations, the above method nevertheless offers useful solutions for existing systems, as it may be implemented with no hardware changes to existing devices. It provides reasonable accurate detection of vertical or horizontal gestures, provided that they are not performed on the edges of the display.

Figure 7:
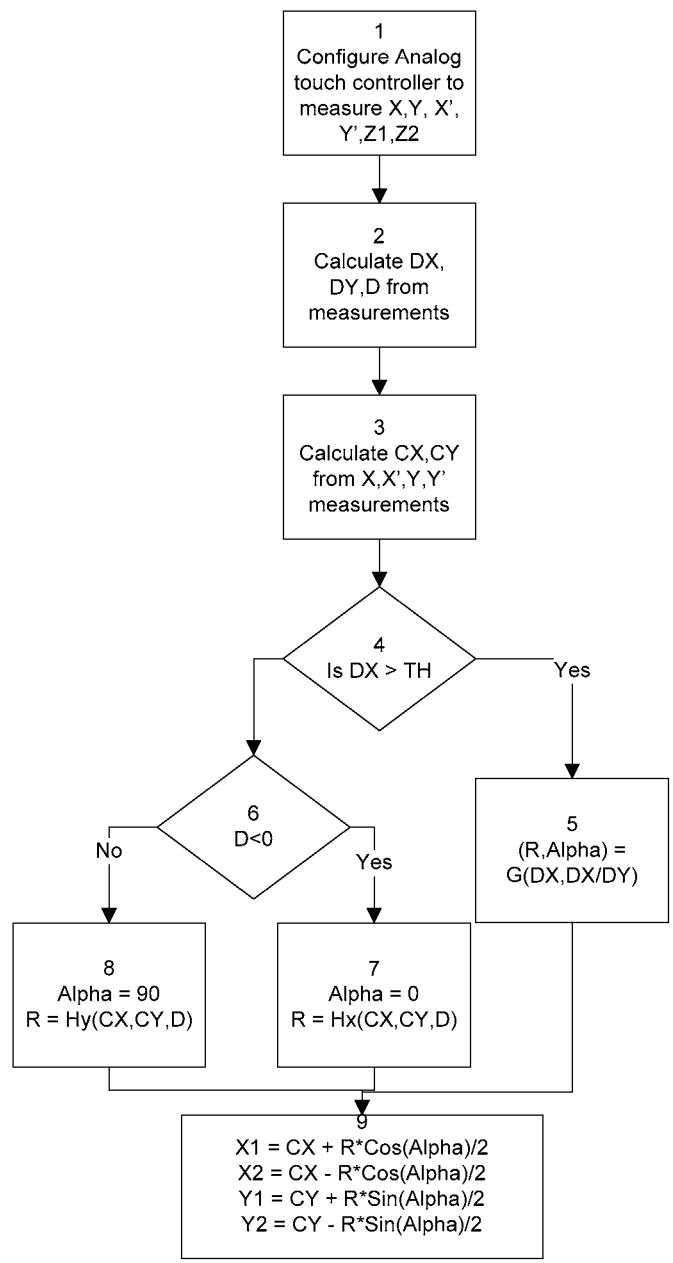
FIG. 7 is a flow chart of a measurement and basic analysis process, in accordance with an embodiment of the present invention.

The above information can be combined in multiple ways to estimate the location of the two touch point. FIG. 7 presents one possible embodiment for the analysis touch controller of this system.

At step 1, the analog touch controller is instructed to perform the X, X', Y, Y', Z1 and Z2 measurements. At step 2, the terms $$DX=X-X',\quad (14)$$

$$DY=Y-Y',\quad (15)$$

and $$D=R\text{touch}1-R\text{touch}2\quad (16)$$

are calculated. At step 3, the central point CX, CY is estimated by calculating $$CX=(X+X')/2 \text{ and } CY=(Y+Y')/2.\quad (17)$$

At step 4, the magnitude of DX is tested to see if it large enough (should be larger than a few LSB of the sampler in order to provide relevant info). If so, then at step 5 the R and Alpha values are derived by using the function G, as defined hereinabove. If the test of step 3 is negative, then at step 6 the sign of D is tested to determine if the points are on a close to vertical (Alpha=90) or close to horizontal (Alpha=0) line, and the distance between the points is then derived by using either $$Hx(CX,CY,D)=R\quad (18)$$

at step 7, or by using $$Hy(CX,CY,D)=R\quad (19)$$

at step 8. The values of the two touch points are then estimated at step 9 according to $$X1=CX+0.5R\cos(\text{Alpha}),\quad (20)$$

$$X2=CX-0.5R\cos(\text{Alpha}),\quad (21)$$

$$Y1=CY+\sin(\text{Alpha}),\text{ and}\quad (22)$$

$$Y2=CY-\sin(\text{Alpha}).\quad (23)$$

The above embodiment of the present invention uses the function G from EQ. (8) to derive the estimated location. From analysis of the mathematical model and empirical test it follows that the values of the function are nearly independent of the center point location, unless one of the touch points is very close to one of the touch screen edges. In an alternative embodiment of the present invention, this limitation is reduced by including fixed resistors between the connection of the analog touch controller and the touch screen electrodes. By including these resistors the detection problem is avoided, but the dynamic value of the analog touch controller D/A convertor is decreased.

A reasonable tradeoff is to employ resistors with value of approximately 10% of the Xplate resistance. This eliminates the detection problem, and does degrade the dynamic range significantly.

It will be apparent to one skilled in the art that other embodiments for deriving the estimated location of the two touch points may be implemented, based on the multiple results obtained from the analog touch controller. These other embodiments use, but are not limited to, a combination of the above embodiments where the approximated touch point pairs are calculated, and then verified using an LMSE to database, or using samples or a model to derive a more accurate approximation.

The above embodiments also cover the case of single touch point. The derived results from the above embodiments for this case are two touch points that are overlapping.

It will be apparent to those skilled in the art that consecutive samples of the derived approximation of the touch points may be used to detect any defined double finger gesture, when the modified analog touch controller is used, and to detect vertical and horizontal gestures, when a standard analog touch controller is used.

In the foregoing specification, the invention has been described with reference to specific exemplary embodiments thereof. It will, however, be evident that various modifications and changes may be made to the specific exemplary embodiments without departing from the broader spirit scope of the invention as set forth in the appended claims. Accordingly, the specification and drawings are to be regarded in an illustrative rather than a restrictive sense.

What is claimed is:

1. A system for detection of single and double stylus and finger taps and gestures, comprising:
   a resistive touch screen, comprising:
      a dual layer of conducting film;
      an isolation layer between the two conducting films; and
      two electrodes on each film sheet sides;
   an analog touch controller capable of:
      applying voltage gap between two electrodes attached to one film and measuring the sensed voltage on both of the electrodes on the other sheet; and
      applying voltage gap between two electrodes when one is attached to one film and the other to the second, and measuring the sensed voltage on the other two electrodes; and
   a touch analysis controller operating as standalone device or embedded in a system controller,
   wherein said touch analysis controller collects at least six different measurements from said analog touch controller and uses them to determine if the touch screen is touched on a single or multiple points, and to estimate the location of a single or double touch points.

2. The system of claim 1 wherein touch said analysis controller uses measurements of DX, DY and D or Ry' to determine if the touch screen is touched on a single or multiple points and to estimate the location of a single or double touch points.

3. The system of claim 2 wherein said touch analysis controller determines, based on the magnitude of the measurements of DX, DY, whether to approximate the gap between touch points (dX and dY) based on a calculation using DX and DY, or based on a calculation using D or DR.

4. The system of claim 1 wherein only a single finger touch is required to calibrate the touch display and derive the Ry value.

5. The system of claim 1 wherein consecutive samples of approximated touch points are used to detect single and double finger gestures.

6. The system of claim 1 wherein the controller samples X, Y, X', Y' and based on their results determines which Z measurement pairs to execute and/or use for the dual touch point calculations.

7. A system for detection of single and double stylus and finger taps and gestures, comprising:
  a resistive touch screen, comprising:
    a dual layer of conducting film;
    an isolation layer between the two conducting films; and
    two electrodes on each film sheet sides;
  an analog touch controller capable of
    applying voltage gap between two electrodes attached to one film and measuring the sensed voltage on an electrode on the other sheet; and
    applying voltage gap between two electrodes when one is attached to one film and the other to the second, and measuring the sensed voltage on the other two electrodes; and
  a touch analysis controller operating as standalone device or embedded in a system controller,
  wherein said touch analysis controller collects all four measurements from said analog touch controller (X, Y, Z1, Z2) and uses them to determine if the touch screen is touched at a single point or at multiple points.

8. The system of claim 7 wherein said touch analysis controller uses a value D or DR as described in this application as a distinction between single and double or more finger touch.

9. The system of claim 7 wherein said touch analysis controller uses the value D or DR as a distinction between single and double finger touch, and the sign of D or DR to distinguish between horizontal and vertical separation of the two fingers.

10. The system of claim 7 wherein said gestures include one of the following: double finger tap, double finger swipe up, down, left or right and double finger pinch in or out on the horizontal or vertical direction.

* * * * *